Dec. 7, 1965  A. A. BURRELL  3,222,236
METHOD OF SPLICING A BELT
Filed March 11, 1963  2 Sheets-Sheet 1
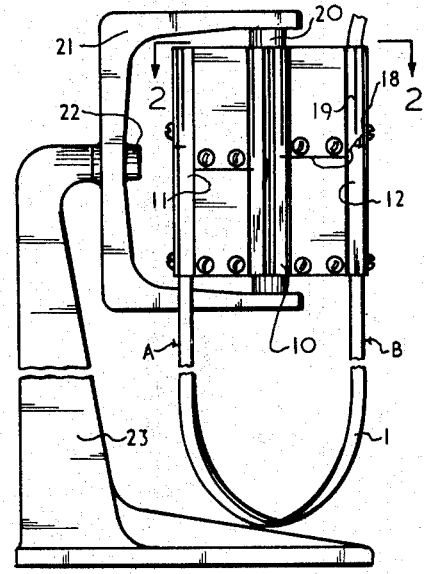
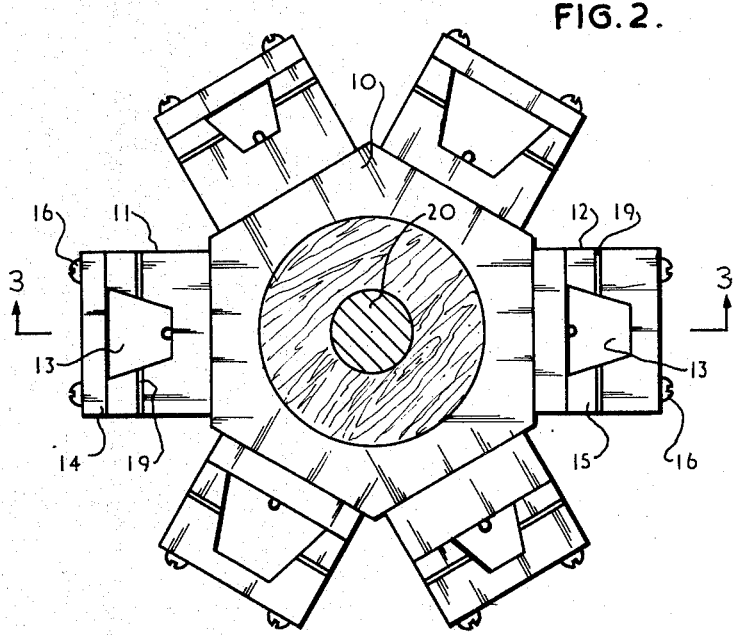
INVENTOR
ALFRED A. BURRELL
ATTORNEY Dec. 7, 1965  A. A. BURRELL  3,222,236
METHOD OF SPLICING A BELT
Filed March 11, 1963  2 Sheets-Sheet 2

INVENTOR
ALFRED A. BURRELL
ATTORNEY

United States Patent Office 3,222,236
Patented Dec. 7, 1965

3,222,236
METHOD OF SPLICING A BELT
Alfred A. Burrell, 10323 106th St., Edmonton,
Alberta, Canada
Filed Mar. 11, 1963, Ser. No. 264,137
5 Claims. (Cl. 156—139)

This invention relates to a method of and apparatus for splicing a belt and appertains particularly to the splicing of a so-called V-type belt formed from a measured length of special belt stock of trapezoidal or other suitable cross-section.

It has been common practice to join the ends of belts made of layers or plies of fabric, rubberized material or the like by stepped, scarfed or tapered and bias splices and while these joints have given satisfactory service in some cases, they have failed in the main to provide a connection of adequate strength due in part to the deficiencies of the belt composition per se and the absence of intimate relation between the specific belt structure and splice design. A preferred V-belt material which I call "Adapta V-Belting" and a spliced V-belt which I call "Adapta V-Belt" are disclosed in a companion application entitled "Belt and Splice Therefor."

An object of this present invention is to provide a method of splicing a belt involving the accurate cutting and secure connecting of the ends of a belt in a strong flexible joint.

A further object of the invention is to provide a method of measuring the belting and cutting of the splice ends thereof to produce a belt of the exact size desired.

A further object of the invention is to provide an apparatus in which opposite ends of a predetermined length of belting are held and cut for splicing.

A still further object of the invention is the provision of a method of and apparatus for splicing belts that is capable of being worked in mass or custom production of belts such as the so-called V-type belts and by means of which belts may be produced having an exact predetermined outside circumference length and in which the splice area possesses a tensile, load-carrying strength substantially equal to that of the unbroken area.

To the accomplishment of these and related objects that shall become apparent as the description proceeds, the present invention resides in the method, apparatus and utilization thereof as shall be now more fully described, illustrated in the accompanying drawings and defined specifically in the appended claims.

The invention will be best understood and can be more clearly described when reference is had to the drawings forming a part of this disclosure wherein like characters indicate like parts throughout the several views.

In the drawings:

FIGURE 1 is a side elevation of a possible embodiment of my belt splicing apparatus;

FIGURE 2 is an enlarged sectional plan of the rotatable jig as seen from line 2—2 thereof;

Figure 4:
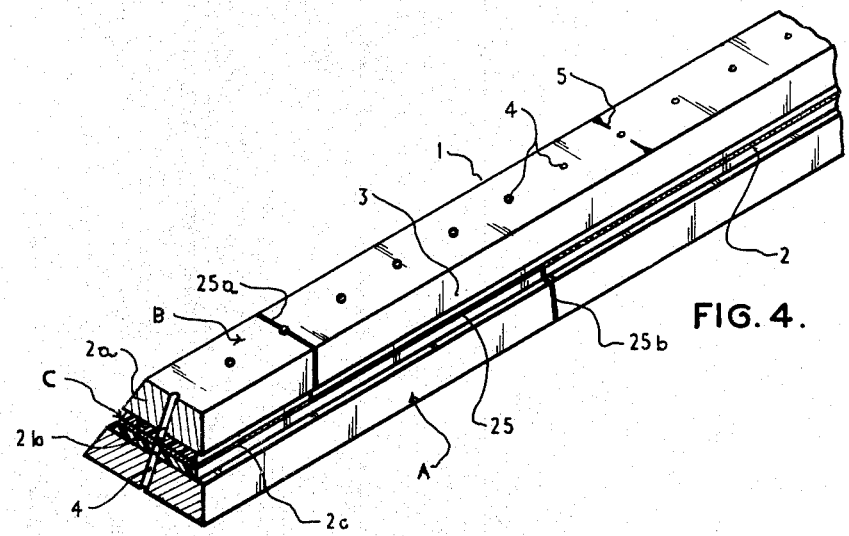
FIGURE 4 is a perspective view of a portion of a V-belt embodying a stepped splice made in accordance with this invention.

Belts may be fabricated initially as endless belts, such as the molded ones that are built up layer by layer on a drum, or formed from a measured length of suitable belting material with opposite ends connected by a splice or other joint. The spliced portion of a belt 1 of the latter type is shown in FIGURE 4. In cross-section the belt is of trapezoidal or truncated V shape and consists of an outer tension section A, an inner compression section B and a central or intermediate load-bearing neutral axis section C. The belting material illustrated corresponds with that set forth in my mentioned companion application and includes a wide, flat, load-carrying ribbon member 2 in its neutral axis section, located preferably midway of the height or thickness of the V-belt. In the longitudinally stepped joint or splice 3 shown, it will be seen that each end of the load-carrying ribbon has been split horizontally midway of its height, for the width thereof and for the length of the overlap so as to provide a one-half thickness ribbon part for the entire confronting area of the horizontal intermediate reach of the step of each of the complementary parts of the splice overlap. I have considered it desirable to construct the loadcarrying ribbon 2 of a pair of ribbon members 2a and 2b spaced apart by a thin separator or filler tissue 2c as this greatly facilitates the clean and accurate horizontal slitting of the neutral axis load-carrying member and simplifies and improves the bonding of the stepped splice.

The belting material strip has a row of small perforations 4 extending vertically therethrough along the longitudinal median accurately spaced at one-half inch intervals and also clear and easily discernible transverse measurement markings 5 on the upper and/or lower side of the belt that intersect each twenty-fourth perforation to indicate linear feet. Any comparable variation of this spacing of the perforations and marking of linear distance may be used as is found desirable.

On account of the difficulty heretofore experienced in producing belts to an exact predetermined length because of the many variables encountered in the manfuacturing process so that belts now marketed are usually measured and coded after their manufacture is completed, I attach great importance to the accurate spacing of the "count" perforations 4 and the linear measurement markings 5 together with the precise cutting and joining of the ends in the splice. By carefully following the present method it is possible to produce not only one but quantities of my "Adapta Belts" having exactly the same predetermined length. Consequently when using such belts in sets, as in multiple groove sheaves, great advantage results from their being accurately matched sets. This will mean much in improved performance and make a substantial contribution to industry by eliminating many of the difficulties that currently flow from the unavoidable variations.

Furthermore, this spliced belt, providing for the first time a simple overlap splice with substantially the strength of the unbroken portion, enables a supplier to meet his customers' needs, of the user of many belts to provide for his own requirements, from a greatly reduced inventory as he has but to stock the various standard materials and can construct the belts to size on demand.

Specifically, I have found it best to make the splice 3 by forming complementary steps on opposite ends of a carefully measured length of belting material described, the overall measurement being the length of the outside circumference of the belt desired (plus or minus one-quarter inch) together with the length of the stepped overlap. It is best to begin and end the measurement each at the centre of one of the perforations 4. To provide the requisite tensile strength in the splice, a schedule of overlap should be followed, as for example:

| Belt width (top) | Number of holes | Overlap, inches |
|---|---|---|
| ½ inch | 4 | 2 |
| 21/32 inch | 4 | 2 |
| ⅞ inch | 5 | 2½ |
| 1¼ inch | 7 | 3½ |
| 1½ inch | 10 | 5 |

Broadly stated, the length of the splice overlap should be from two to six times the width of the top or outside of the belt and preferably three or four times such width.

The ends of the measured length of belting are cut vertically half way through the belt on a transverse line spaced in from the end by the length of the splice overlap, one from the top and the other from the bottom, so that each vertical cut severs one ribbon member 2a and 2b respectively and stops in the thin separator tissue 2c. The ends are next slit horizontally in from the ends, midway of the height, i.e., through the separator tissue, for the length of the overlap thereby meeting the respective vertical cuts and the unwanted cut-away parts are removed leaving a pair of perfectly complementary oppositely stepped ends each with a wide flat ribbon member extending over the entire area of its horizontal or intermediate reach. These ribbon-faced steps are overlapped and bonded securely both on their confronting horizontal faces and vertical ends.

Figure 3:
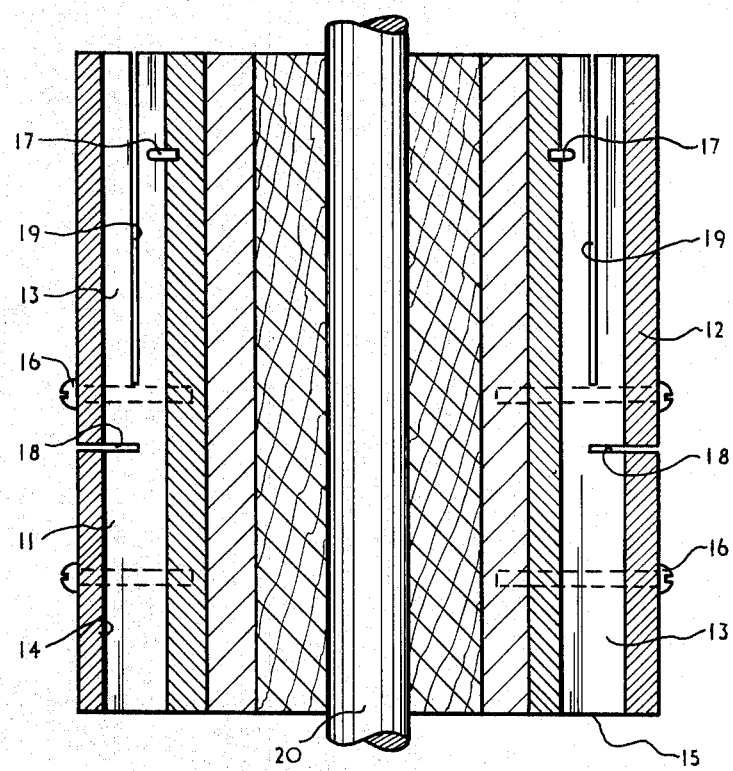
FIGURE 3 is a vertical transverse section as taken on line 3—3 of FIGURE 2.

Having determined the exact length of belting material required to make a desired "Adapta-Belt," the measurement beginning with a clean, vertical and transverse cut at the centre of one of the perforations 4, the oppositely stepped ends of the splice are best prepared and accurately cut in a suitable piece of apparatus, such, for example, as the simple jig 10 shown in FIGURES 1, 2 and 3. Preferably the jig includes two templates 11 and 12 mounted on opposite sides thereof, each with an open vertical passageway 13 corresponding in cross-section with the shape and dimensions of the particular belting material it is designed to handle, but reversely disposed in the sense that in template 11 the inside of the belt or the truncated side of the V is toward the inside of the jig and in template 12 it faces away from the jig. Each template may be opened to freely admit the end of the belting material; in template 11 only the face plate 14 that defines the wide top of the truncated V is separable but in template 12 the separable part or cover plate 15 defines the narrow truncated base and oppositely sloping sides of the V. In each case the removable or separable plate 14, 15 may be secured to its template body 11, 12 by screws 16. By removing the plates, or even loosening the securing screws, it will be obvious that the belting end can be readily inserted in the respective template passageway, the intermediate length of belting being looped intermediate its ends as seen in FIGURE 1 and also longitudinally twisted through an angle of 180 degrees to bring its opposite ends into what is described as reversely disposed position. To hold the inserted ends of the belting against longitudinal displacement in the template passageways 13, each template has a small pin 17 projecting outwardly into the passageway spaced exactly one-half inch below the upper end of the template and of a diameter to fit snugly in one of the belt perforations 4. Thus when the belt ends have been positioned in the templates and the covers secured in place the belt ends are perfectly arranged and firmly held. Two inches below the top of each template 11, 12 a horizontal slot 18 extends in to a point midway of the vertical passageway and running down from the top of each template is a transversely disposed vertical slot 19 that bisects the truncated V passageway midway of its cross-sectional depth. Guided in the slots 18, a suitable cutting instrument cuts the belting material on a transverse line two inches in from the end, half way through from top and bottom respectively in each case severing one of the ribbon members 2a, 2b while guided in the slots 19 the instrument slits the belting midway of its truncated V-shaped height, namely through the separating tissue 2c. In the shown form of template the slots 19 do not quite reach to the horizontal slots 18, for simplicity in making the template, but it is easy on removing the belt ends from the jig to complete the slitting and remove the unwanted severed, step-forming portion from each end.

The present jig is made with six templates, providing reversely disposed opposite end templates for three sizes of belting and while in each pair of template passages the vertical slots 19 are centered to bisect the height of the truncated V, it will be noted in FIGURE 1 that the horizontal slots 18 are at different distances from the top end of the templates to provide varying lengths of overlap as mentioned in the foregoing overlap schedule.

Variations in the belt cross-sectional shape, in spacing of the perforations and other dimensions may be made as found desirable.

In the present jig, the templates are arranged in three radial pairs, being rotatable on a vertical axial core 20 held by a yoke 21 centrally pivoted as at 22 in a secure and steady standard 23.

When the belt ends have been cut in complementary steps, it is desirable that they be brought together and held in perfect alignment and registry for the bonding thereof, which bonding, seen at 25 in FIGURE 4, securely unites the overlapped confronting surfaces of the load-carrying ribbon parts 2a and 2b and the abutting ends of the offset vertical parts of the steps as at 25a and 25b. It is significant that this stepped overlap splice provides for a large area of bonding between the confronting faces of the wide flat inextensible load-carrying ribbon parts 2a, 2b for herein lies the unusual strength of the splice. Lying too in the neutral axis section C, the bonded ribbon at the splice is not subject to varying conditions of tension and compression as are the resilient tension and compression areas A and B. As the separator tissue 2c is largely removed in the cutting of the steps, the bonding of the overlapped ribbon parts 2a, 2b adds nothing to the normal thickness of the composite load-carrying ribbon 2, nor reduces its tensile strength nor lessens its flexibility.

From the foregoing description taken in connection with the accompanying drawings, it will be manifest that a method of and apparatus for splicing a belt is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. The method of manufacturing a V-belt comprising the steps of fabricating a belting material having a wide inextensible load-carrying ribbon in its neutral axis section centrally of its depth forming complementary steps on opposite ends of a length of said belting material by slitting said ends horizontally approximately midway of the thickness of said ribbon, removing the unwanted material above and below the slits in said respective ends; and bonding the confronting faces of said wide inextensible ribbon in the overlapped complementary stepped ends to provide an endless belt having a continuous load-carrying ribbon in its neutral axis section.

2. The method of splicing a V-belt, comprising the steps of fabricating a belting material having a wide flat inextensible load-carrying ribbon approximate midway of the height thereof; forming complementary steps on opposite ends of the length of said belting material by slitting each end horizontally for the same distance, wherein the horizontal slits divide the ribbon; removing the unwanted material above the slit from one end and below the slit from the other end of the belting; and bonding the confronting faces of the wide flat ribbon in the overlapped complementary stepped ends to provide an endless belt having a continuous load-carrying ribbon in its neutral axis section.

3. The method of making a spliced belt comprising the steps of fabricating a strip of belting material having a wide, inextensible load-carrying horizontal ribbon in its neutral axis section; punching a row of small accurately spaced perforations vertically therethrough along the longitudinal median; applying transverse measurement markings on the upper side of said material intersecting certain of said perforations at known distances; measuring off the outside circumference length of the belt desired together with the length of the splice overlap by utilizing the transverse measurement markings and count of the spaced perforations, beginning and ending at the centre one of said perforations; severing such measured length of belting material; forming complementary steps on opposite ends of the severed length of belting material by slitting each end horizontally for the predetermined splice overlap distance, wherein the horizontal slits divide the wide, inextensible, load-carrying, horizontal ribbon; removing the unwanted material above the slit from one end and below the slit from the other end of the belting; and bonding the confronting slit faces of the ribbon at the overlapped complementary stepped ends to provide an endless belt having a continuous load-carrying ribbon in its neutral axis section.

4. A method of forming a V-belt from a measured length of belt stock of trapezoidal cross section consisting of an outer tension section, an inner compression section, and an intermediate, load-bearing, neutral axis section comprising the steps of fabricating the neutral axis section with a wide, flat, two-part ribbon located midway of the thickness of the belt material, the pair of ribbon-forming members being disposed one above the other and spaced apart by a thin filler tissue; forming complementary steps on opposite ends of the length of belting by slitting each end horizontally for the same distance with the horizontal slits running through the filler tissue; vertically cutting the belt half way through from the top at one end and from the bottom at the other end so that each vertical cut severs one of the spaced ribbon-forming members and stops at the filler tissue; and bonding the confronting fares of the overlapped pair of ribbon-forming members to provide an endless belt having a continuous, wide, flat ribbon in its intermediate, load-bearing neutral axis section.

5. A method of forming a V-belt from a measured length of belt stock of trapezoidal cross section consisting of an outer tension section, an inner compression section, and an intermediate load-bearing neutral axis section comprising the steps of fabricating the neutral axis section with a wide, flat, two-part ribbon located midway of the thickness of the belt material, with the pair of ribbon-forming members being disposed one above the other and spaced apart by a thin filler tissue; forming complementary steps on opposite ends of the length of belting by slitting each end horizontally for the same distance with the horizontal slits running through the filler tissue and substantially removing the same; vertically cutting the belt half way through from the top near one end and the bottom near the other end so that each vertical cut severs one of the spaced ribbon-forming members and stops at the inner end of the respective horizontal slit in the filler tissue; and bonding the confronting faces and abutting ends of the overlapped pair of ribbon-forming members to provide an endless belt having a continuous wide, flat ribbon in its intermediate, load-carrying neutral axis section.

References Cited by the Examiner
UNITED STATES PATENTS

| | | | |
|---|---|---|---|
| 1,148,584 | 8/1915 | Gerrish | 156—258 |
| 1,315,238 | 9/1919 | Peters | 269—9 |
| 2,107,635 | 2/1938 | Junkermann | 269—9 |
| 2,446,310 | 8/1948 | Steinke | 156—137 |
| 2,794,726 | 6/1957 | Riedesel et al. | 156—254 |
| 2,932,340 | 4/1960 | Poeschl | 156—258 |
| 3,053,724 | 9/1962 | Galloway | 156—258 |

EARL M. BERGERT, *Primary Examiner.*

DOUGLAS J. DRUMMOND, *Examiner.*